(12) United States Patent
Lester

(10) Patent No.: US 6,176,344 B1
(45) Date of Patent: Jan. 23, 2001

(54) METHOD AND SYSTEM FOR DETERMINING THE AZIMUTH POSITION AND DISTANCE OF A REFLECTING SUBSURFACE FORMATION

(75) Inventor: Robert A. Lester, Houston, TX (US)

(73) Assignee: Western Atlas International, Inc., Houston, TX (US)

(*) Notice: Under 35 U.S.C. 154(b), the term of this patent shall be extended for 0 days.

(21) Appl. No.: 08/957,889

(22) Filed: Oct. 27, 1997

(51) Int. Cl.[7] ....................................... G01V 1/40
(52) U.S. Cl. ............................. 181/104; 367/31
(58) Field of Search ........................... 702/11, 6; 367/25, 367/31; 181/106, 104, 102

(56) References Cited

U.S. PATENT DOCUMENTS

| | | | |
|---|---|---|---|
| 4,739,272 | * 4/1988 | Griffin et al. | 324/339 |
| 4,832,148 | * 5/1989 | Becker et al. | 181/104 |
| 5,229,553 | * 7/1993 | Lester et al. | 181/102 |
| 5,357,481 | * 10/1994 | Lester et al. | 367/31 |
| 5,731,550 | * 3/1998 | Lester et al. | 181/102 |
| 5,808,963 | * 9/1998 | Esmersoy | 367/31 |
| 5,852,262 | * 12/1998 | Gill et al. | 181/106 |

* cited by examiner

Primary Examiner—Christine Oda
Assistant Examiner—Victor J. Taylor
(74) Attorney, Agent, or Firm—Darryl M. Springs; K. P. Sriram

(57) ABSTRACT

A method and system for determining the azimuth position and distance of a reflector or subterranean reflecting surface of a formation bed outside a borehole. A monopole transmitter may be used with a monopole/dipole receiver pair, or a monopole transmitter and a dipole transmitter pair may be used with a monopole receiver in accordance with the invention to determine the azimuth position and distance of the reflector. Azimuth resolution is improved through use of multiple receiver elements at equal radius about the longitudinal axis of a borehole tool, or through mathematical rotation of receiver elements.

9 Claims, 3 Drawing Sheets

METHOD AND SYSTEM FOR DETERMINING THE AZIMUTH POSITION AND DISTANCE OF A REFLECTING SUBSURFACE FORMATION

FIELD OF THE INVENTION

The invention relates generally to sonic tools for borehole logging, and more particularly to a method and system for determining the azimuth position and distance of a reflecting subsurface formation outside a borehole.

BACKGROUND OF THE INVENTION

Well logging generally involves the generation and transmission of acoustic signals through an earth formation of interest, and the reception of the signals at a point spaced from the transmitter. By knowing the distance between the transmitter and the receiver, and the time required for an acoustic signal to travel that distance, the velocity of sound in the formation may be calculated. Once the velocity is known, other properties of the formation may be determined.

A problem encountered in acoustic well logging is that acoustic energy propagates in both shear and compressional modes, and the velocity of each mode depends on the propagating medium. Thus, the generation of a non-directional acoustic signal results in compressional waveforms in the drilling mud, and both shear and compressional waveforms in the borehole casing surrounding an earth formation, with each waveform having a different velocity. A composite waveform thus may be detected which overshadows the formation mode, and makes difficult an accurate representation of the time of arrival of the formation mode.

Attempts to overcome this problem have involved complicated analytical techniques as disclosed in U.S. Pat. No. 4,951,267; or complicated electronic and mechanical systems as disclosed in U.S. Pat. No. 3,475,722, U.S. Pat. No. 3,426,865, and U.S. Pat. No. Re 33,472.

A further problem arises from the seismic waves being reflected by a subterranean reflecting surface ("reflector"), and the reflected wave being detected by a conventional seismic detector such as a hydrophone as disclosed in U.S. Pat. No. 4,789,968. The monopole tube waves, and dipole and higher multipole order modal waves, tend to dominate the response and obscure the seismic waves that were reflected by the reflector.

Geophones attached directly to a borehole wall, as disclosed in U.S. Pat. No. 5,128,898, have been used instead of hydrophones to reduce such tube wave noise, but the speed at which down-hole data may be acquired is substantially reduced.

Further, directionally sensitive detectors have been used which are insensitive to all components of the seismic waves, except the component occurring in a particular direction. By way of example, only the component of the seismic wave impinging the detector in a line parallel to the longitudinal axis of the detector may be detected. The directionally sensitive detectors have been mounted for rotational movement on complex servo systems for orientation in a desired direction as disclosed in U.S. Pat. No. 2,959,240 and U.S. Pat. No. 3,496,533, or have required complex electrical and mechanical transducer structures as disclosed in U.S. Pat. No. 4,951,267.

Further shortcomings of the prior art appear in U.S. Pat. No. 3,961,307 which requires a planar surface of sufficient size to mount transducers, approximately a half wavelength. A logging tool is typically 4" in diameter. The wavelength of sound at 1000 Hz is 5 feet. Thus, the process disclosed in the patent is practical only at very high frequencies, which places a substantial limitation on the depth of investigation in an azimuthal direction.

The devices disclosed in U.S. Pat. Nos. 4,832,148 and 4,951,267 measure formation anisotropy, and will not work with isotropic formations. Neither of the devices will respond to objects such as salt domes or other boreholes in a formation.

U.S. Pat. No. 4,703,459 uses only a two-transducer array, and is sensitive to external noise sources such as gas leaks. No consideration is given to using a transmitter in conjunction with a receiver to allow echo ranging, and to determine the azimuth position of passive features such as the boundary of a reflecting subsurface formation of a salt dome, or another borehole. The two-transducer array that is disclosed would be too inaccurate to be useful for determining formation layer boundaries in a longitudinal borehole. That is, the signal that is produced is small at null, and has two broad maximum signals with little phase difference at the peaks. Further, the disclosed two-transducer array would be susceptible to noise in a direction ninety degrees to a principal response direction.

In accordance with the present invention, the direction of a transmitted waveform is selected by controlling the magnitude and polarity of the driving signal of an acoustic transmitter, and by detecting only that signal that is in the vector direction of a directionally sensitive receiver. The components of the received waveform thereby are effectively separated. When a three-element configuration of a monopole transmitter and a monopole/dipole receiver pair is used, a response having a single, unambiguous peak in the direction of a reflector is produced. Interfering signals such as reflections from fractures and other unwanted responses are discriminated against. The receiver pair is positioned so that a phase measurement is made when both the monopole and dipole receivers have substantial amplitudes. That is, one receiver is not looking away from the source.

SUMMARY OF THE INVENTION

A simplistic and inexpensive system and method for determining an azimuth position of a subterranean reflecting surface or reflector outside a borehole, wherein the phase of the response of a monopole/dipole receiver pair to a reflection of a waveform generated by either a monopole or a dipole transmitter is used as a measure of the azimuth position.

In one aspect of the invention, a cardioid pattern having a null and a peak is formed from monopole and dipole beam patterns of equal amplitude. The monopole and dipole beam patterns in turn are respectively formed from the sum and difference of responses of a monopole/dipole receiver pair to a reflection of an acoustic waveform transmitted by either a monopole or a dipole transmitter. The peak of the cardioid pattern provides an indication of direction of the formation reflector.

In another aspect of the invention, the azimuth position and cardioid pattern are used in conjunction with a transmitter sync signal and a borehole tool azimuth reference signal to automatically determine the distance and direction of a reflector outside a borehole.

In further aspect of the invention, eight receiver transducers are positioned in a circle of equal radius about the longitudinal axis of a borehole tool in accordance with the present invention to provide an azimuth resolution of forty-five degrees.

In a still further aspect of the invention, a monopole and a dipole transmitter pair is used with a single monopole receiver to obtain the azimuth direction of a reflection.

BRIEF DESCRIPTION OF THE DRAWINGS

Additional objects, features and advantages of the present invention will become apparent from the following detailed description when read in conjunction with the accompanying drawings in which.

DESCRIPTION OF PREFERRED EMBODIMENTS

Preferred embodiments of the invention will now be described with reference to the accompanying drawings.

Figure 1:
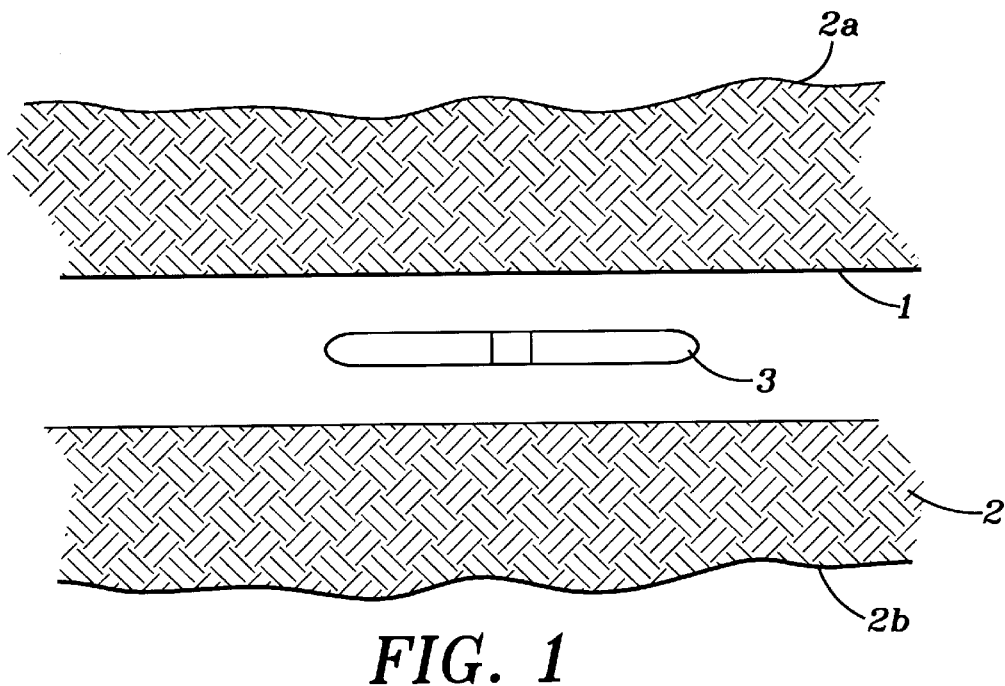
FIG. 1 is a graphic illustration of a horizontal or longitudinal borehole within a thin shale bed.

Referring to FIG. 1, a horizontal borehole 1 in a thin shale bed 2 is shown, in which a logging or borehole tool 3 follows a drilled borehole, and in accordance with the invention may indicate where the tool is located between shale bed boundaries 2a and 2b.

Figure 2:
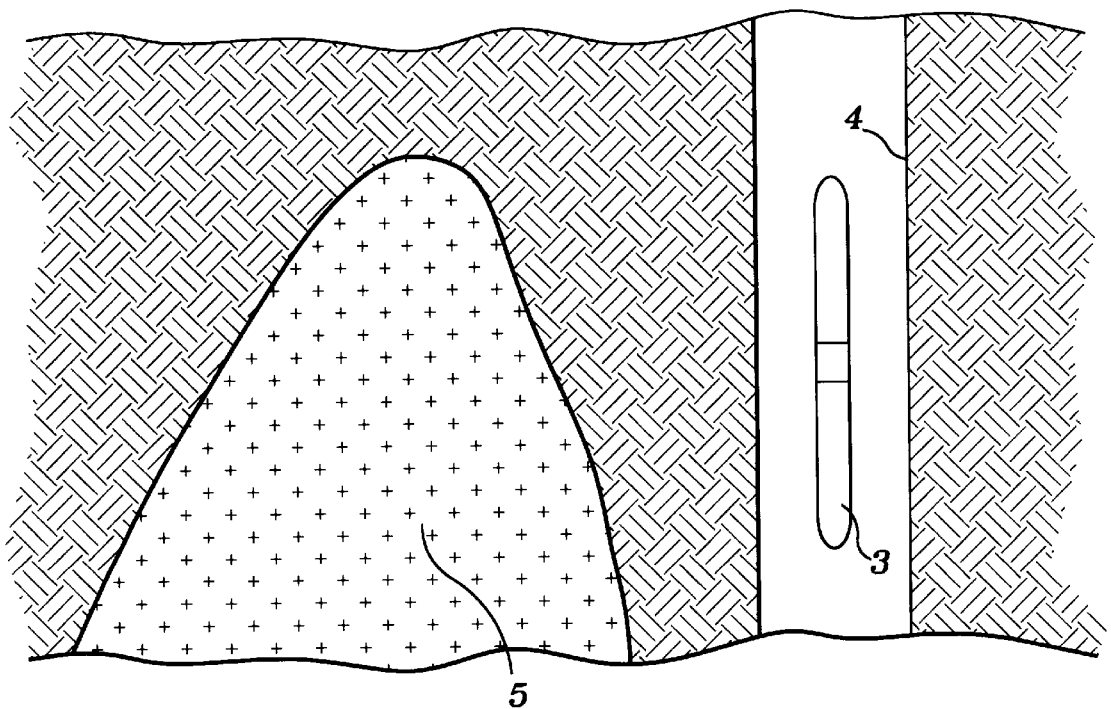
FIG. 2 is a graphic illustration of a vertical borehole with a logging or borehole tool in close proximity to a salt dome.

FIG. 2 shows a vertical borehole 4 with logging tool 3, where in accordance with the invention, the logging tool determines both the azimuth position of a salt dome 5, and thereafter the distance of the salt dome from the borehole. More particularly, the distance to the reflector can be determined by transmitting a short tone burst of energy, and then measuring the arrival time of the reflection relative to the time of transmission. Since the velocity of sound in the formation is generally known from other measurements or can be closely estimated from geologic data, the distance to the reflector can be calculated. It should be noted that the velocity of sound in the formation can also be estimated by measuring the time delay of the direct refracted arrival of this tool alone. The time duration of the tone burst should be long enough to allow the use of the phase information in the reflected energy, but short enough to permit measuring its arrival time.

Usually 5 to 6 cycles of signal are sufficient for both of these purposes.

Figure 3:
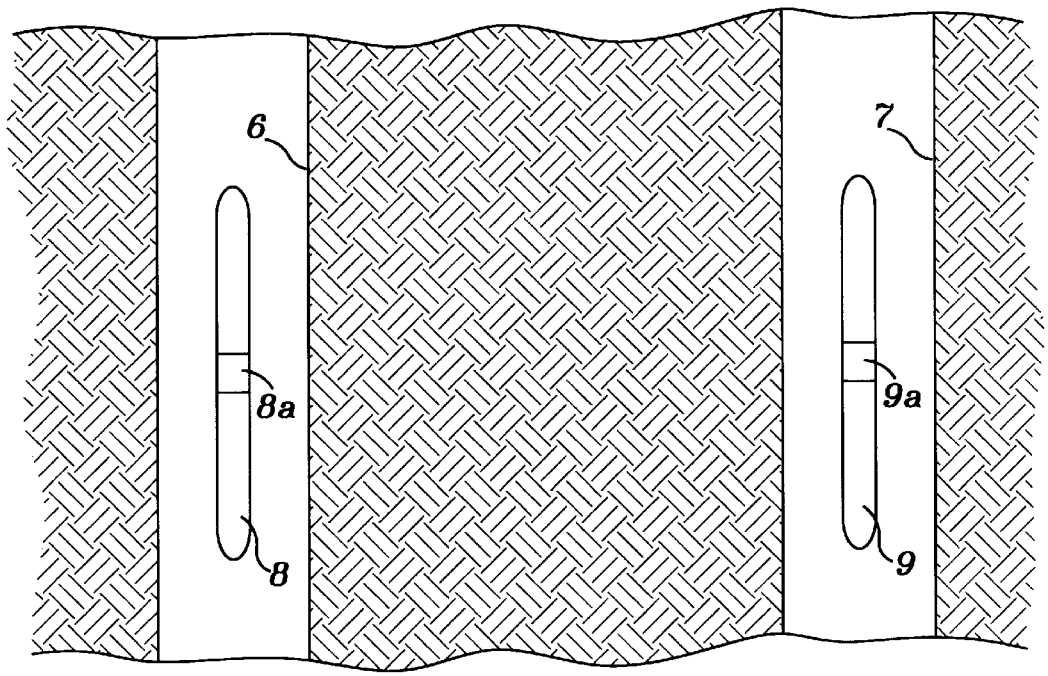
FIG. 3 is a graphic illustration of two vertical boreholes, with one borehole having an acoustic source, and the second borehole having a directional receiver in accordance with the invention.

FIG. 3 shows two vertical boreholes 6 and 7, respectively with logging tools 8 and 9. Logging tool 8 includes an acoustical source or transmitter 8a, and logging tool 9 includes a directional receiver 9a in accordance with the invention. Thus, the direction and distance of one borehole with respect to the other may be measured. Further, in the event that both a transmitter source and directional receivers are in a same borehole, by way of example borehole 7, the direction and an indication of distance of borehole 8 from borehole 7 may be determined in accordance with the invention.

Figure 4:
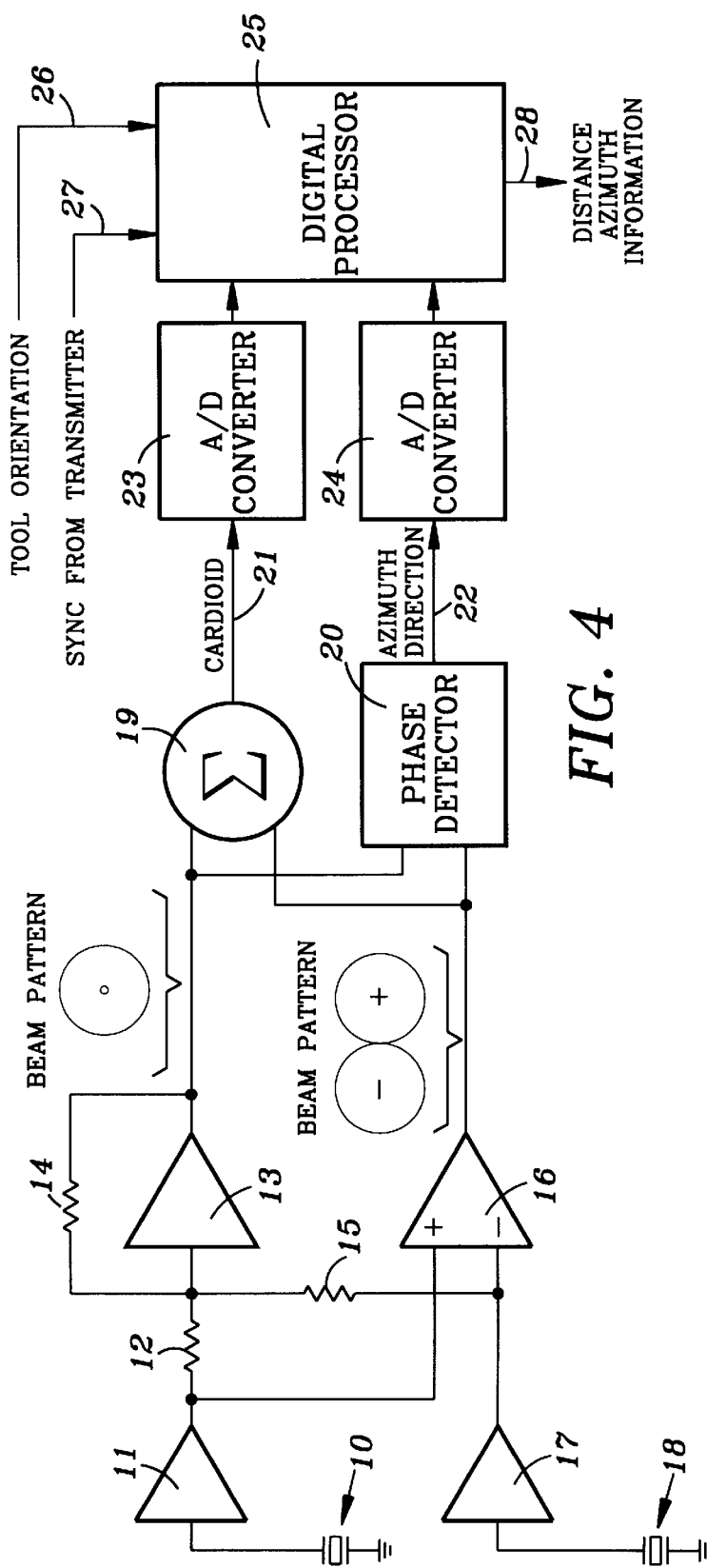
FIG. 4 is an electrical schematic diagram of a receiver system in accordance with the invention for determining the azimuth position and distance of a subterranean reflecting surface or reflector outside of a borehole.

Referring to FIG. 4, a monopole/dipole receiver pair is shown with a monopole receiver 10 electrically connected between ground and an input to an amplifier 11. The output of the amplifier 11 is connected by way of a 5K ohm resistor 12 to an input of a summing amplifier 13, to a 50K ohm resistor 14 leading to the output of amplifier 13, and to a 5K ohm resistor 15 leading to the negative input of a differential amplifier 16. The negative input to amplifier 16 also is connected to the output of an amplifier 17, and the positive input of the amplifier 16 is electrically connected to the output of amplifier 11.

The input to the amplifier 17 is electrically connected to the output of a dipole receiver 18, the input of which is connected to ground.

In the preferred embodiment disclosed herein, receiver 10 is a monopole receiver and receiver 18 is a dipole receiver. The transmitter (not shown) is either a monopole or a dipole transmitter that produces an acoustic pulse waveform which typically may have a frequency ranging from 100 Hz to 1K Hz, depending upon the logging tool type.

The output of amplifier 13 is electrically connected to one input of an adder 19 and to one input of a phase detector 20. In like manner, the output of amplifier 16 is connected to a second input of the adder 19 and to a second input of the phase detector 20.

The type, part number, and manufacturer's name and address for each component and device described above and used in the circuit of FIG. 4 is presented in Table I below.

TABLE I

| REFERENCE NO. | TYPE | MANUFACTURER'S NAME & ADDRESS | PART NUMBER |
| --- | --- | --- | --- |
| 10 | Monopole Receiver | Western Atlas Logging Systems 10205 Westheimer Houston, Texas | 153251 |
| 11 | Amplifier | Analog Devices, Inc. One Technology Way Norwood, Virginia | OP471 |
| 12 | Resistor | Any Standard | |
| 13 | Summing Amplifier | Analog Devices, Inc. One Technology Way Norwood, Virginia | OP471 |
| 14 | Resistor | Any Standard | |
| 15 | Resistor | Any Standard | |
| 16 | Differential Amplifier | Analog Devices, Inc. One Technology Way Norwood, Virginia | AD625 |
| 17 | Amplifier | Analog Devices, Inc. One Technology Way Norwood, Virginia | OP471 |
| 18 | Dipole Receiver | Western Atlas Logging Systems 10205 Westheimer Houston, Texas | 15705G |
| 19 | Summer | Analog Devices, Inc. One Technology Way Norwood, Virginia | OP471 |
| 20 | Phase Detector | Mini-Circuit, Inc. P.O. Box 350166 Brooklyn, New York | MPD-1 |

In operation, the direction of a transmitted waveform of, by way of example only, a monopole transmitter is selected by controlling the magnitude and polarity of a driving signal as is well known by persons skilled in the art. The receivers 10 and 18 receive reflections of an acoustic waveform transmitted by the monopole transmitter through a formation bed. The outputs of receivers 10 and 18 respectively are amplified by amplifiers 11 and 17, and added by amplifier 13 to provide a monopole beam pattern reference with which to measure the phase of the output of differential amplifier 16, as appears on line 22. If the output of phase detector 20 indicates that the signals supplied by amplifiers 11 and 17 are in phase, the direction of the reflection which is the source of the signals is determined by the positive input of the differential amplifier 16. In contrast, if the phase detector 20 indicates that the signals at the outputs of amplifiers 11 and 17 are out of phase, the direction of the reflection is determined by the negative input to the differential amplifier 16.

As before stated, one of the receivers 10 and 18 is a monopole and the other is a dipole. The dipole receiver may be formed by subtracting the outputs of two monopole receivers. A reflection arriving from the front face of the dipole receiver will have the same phase as measured by the monopole receiver. A reflection arriving from the back of the dipole receiver will be 180 degrees out of phase with the response of the monopole receiver.

Further, when a reflection arrives at 90 degrees to the front face of the dipole receiver, the response of the dipole receiver will have only a small amplitude, while the response of the monopole receiver will have a large amplitude.

The direction of the reflection thus is determined without requiring a rotation of the receiver elements in the down-hole tool.

However, azimuth of a reflection giving rise to the inputs to the receivers 10 and 18 may be determined with more certainty by rotating the receivers. By way of example, the azimuth of the receivers 10 and 18 may be changed by allowing the down-hole tool to rotate naturally as the tool is lowered into the borehole, or by rotating the receiver transducers in the tool by means of a motor.

In the alternative, the outputs of the receivers may be treated as vectors, and through control of the vector amplitudes and phases the receiver pair may be mathematically rotated as will be understood by one skilled in the art. By way of example, consider a pressure wave traveling in the -x direction:

$$P = P_0 * \cos(\omega + kx) \quad (1)$$

where

P is the pressure $\omega$ is the angular frequency and k is the wave number, and two pressure transducers located on a line at angle $\theta$ to the x axis. The locations of the two transducers are:

$$x = \pm a \cos(\theta). \quad (2)$$

By substituting the x of equation (2) into equation (1), the pressures measured by the two transducers are $$P_1 = P_0 * \cos(\omega + k*a*\cos(\theta)) \quad (3)$$

and $$P_2 = P_0 * \cos(\omega t - k*a*\cos(\theta)). \quad (4)$$

If each signal is phase shifted through a phase angle $\beta$ by taking the Fourier transform of the signal, altering the phase and taking the inverse transform, the expressions of equations (3) and (4) become:

$$P_1 = P_0 * \cos(\omega t + k*a*\cos(\theta) - \beta) \quad (5)$$

and $$P_2 = P_0 * \cos(\omega t - k*a*\cos(\theta) + \beta). \quad (6)$$

Mathematically adding and subtracting the phase angle $\beta$ is equivalent to rotating the physical transducers. In particular if $\beta = k*a*\cos(\theta)$, the sum $P_1 + P_2$ is maximized exactly as if the pair of transducers had been rotated to a line perpendicular to the arrival direction of the sound.

Figure 5:
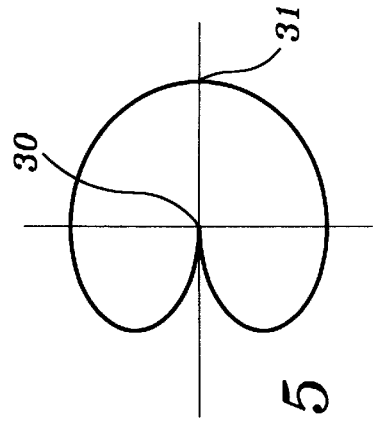
FIG. 5 is a graphic illustration of a cardioid patterned output of summer 19 of FIG. 4.

Further methods to refine a determination of direction of reflection include making the monopole beam pattern output of amplifier 13 and the dipole beam pattern output of amplifier 16 equal in amplitude, thereafter summing the outputs at summing amplifier 19, and plotting the output of amplifier 19 as a function of azimuth. Thus, when the direction of reflection of a transmitted waveform gives rise to signals of equal amplitude at the outputs of amplifiers 13 and 16, the resulting cardioid pattern will have a null 30 and a peak 31 as illustrated in FIG. 5. In a noisy environment, the null 30 may be lost, but the peak 31 will continue to provide directional information.

Figure 6:
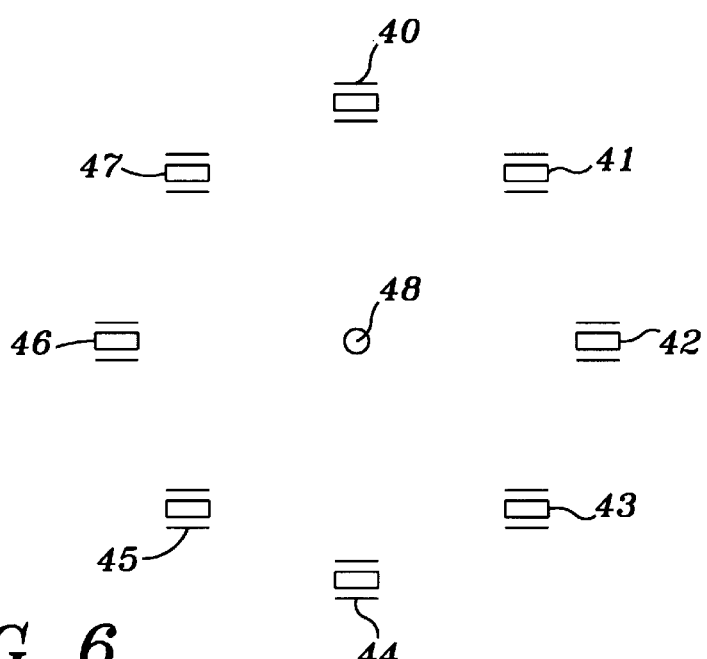
FIG. 6 is a graphic illustration of eight receiving elements positioned in a borehole about the longitudinal axis of a logging tool in accordance with the present invention.

The resolution of the azimuth direction of a reflection may be increased by increasing the number of receivers. For example, if two receivers are used, the direction of reflection may be determined within 180°, for four receivers within 90°, six receivers within 60° degrees, and eight receivers within 45°. Referring to FIG. 6, a preferred embodiment using eight receivers 40–47 about a longitudinal axis 48 of a borehole tool is shown. A monopole transmitter may be located in the tool electronics module, and each of the receiver transducers 40–47 many be a monopole/dipole receiver pair as illustrated in FIG. 4.

The results obtained from an acoustic system comprised of a monopole transmitter and a monopole/dipole receiver pair as described above, may also be obtained by using an acoustic system comprised of a monopole transmitter and a dipole transmitter with a single monopole receiver. In that event, the receiver detects a composite waveform from the reflection of the monopole and dipole waveforms generated respectively by the monopole and dipole transmitters. The output of the receiver is a cardioid beam pattern similar to that of FIG. 5, which provides an indication of azimuth direction when a substantial peak is formed upon pointing the receiver in the direction of the reflector.

In the embodiment described above, the dipole transmitter may be comprised of two monopole transmitters driven out of phase.

As before stated, the invention may determine not only the azimuth position, but also the distance of a reflector outside a borehole. Referring again to FIG. 4, both azimuth position and distance of a reflector are automatically determined through the addition of a digital processor as illustrated. More particularly, lines 21 and 22 are respectively electrically connected by way of A/D converters 23 and 24 to inputs of a digital processor 25, which also receives an azimuth reference signal on line 26 from a tool orientation generator (not shown) to provide an azimuth reference signal, and a transmission sync signal on line 27 from the transmitter to provide a time reference for measuring the difference between time of transmission and time of arrival of a reflection. With these inputs, the digital processor 25 may automatically determine both the azimuth position and distance of a reflector. Such information is output by the processor on line 28.

The present invention has been particularly shown and described in detail with reference to preferred embodiments, which are merely illustrative of the principles of the invention and are not to be taken as limitations to its scope. Further, it will be readily understood by those skilled in the art that numerous changes and modifications may be made without departing from the spirit of the invention. For example, instead of a monopole/dipole receiver pair, a single bimorph or bender element may be used. Further, the acoustic waveform generated by the transmitter of FIG. 4 could be a swept frequency or continuous wave as well as a pulse. Still further, each transmitter or receiver transducer could have a vertical beam pattern, or swept vertical pattern, to obtain more complete imaging data. Also, the transmitter configuration of the present invention could be operated at multiple frequencies to obtain varying resolutions and depth of investigation, and where plural transmitters are used, plural transmitter frequencies could be used simultaneously to determine a match of the wavelength of the formation feature under investigation. Accordingly, it should be clearly understood that the form of the invention as described and depicted in the specification and drawings is illustrative only, and is not intended to limit the scope of the invention. All changes and substitutions which come within the meaning and range of the equivalence of the claims are therefore intended to be embraced therein.

What is claimed is:

1. A method of determining an azimuth position of a subterranean reflecting surface of a formation bed outside a borehole, which comprises:

generating a monopole acoustic waveform for transmission into said formation bed to produce a reflection waveform;

receiving said reflection waveform with both a monopole receiver and a dipole receiver in a borehole tool;

adding a monopole response of said monopole receiver to said reflection waveform and a dipole response of said dipole receiver to said reflection waveform to generate a monopole beam pattern signal;

subtracting said dipole response from said monopole response to generate a dipole beam pattern signal; and detecting a phase difference between said monopole beam pattern signal and said dipole beam pattern signal to provide an indication of said azimuth position of said subterranean reflecting surface.

2. The method of claim 1 including the step of adding said monopole beam pattern signal and said dipole beam pattern signal with equal amplitudes to produce a cardioid pattern signal having a peak which provides a further indication of said azimuth position of said subterranean reflecting surface.

3. The method of claim 1 wherein the step of generating a monopole acoustic waveform is replaced with a step of generating a dipole acoustic waveform for transmission into said formation bed to produce said reflection waveform.

4. The method of claim 1, wherein said monopole acoustic waveform is one of a pulse, swept frequency, and continuous waveform, having one of a horizontal, vertical, and swept vertical pattern.

5. The method of claim 2 further including the steps of:

recording a time of transmission of said monopole acoustic waveform and an azimuth reference signal indicative of an orientation of said borehole tool; and calculating both said azimuth position and a distance of said subterranean reflecting surface outside said borehole as a function of said time of transmission, said azimuth reference signal, said phase difference, and said cardioid pattern signal.

6. A system for determining an azimuth position of a reflector of a formation bed outside a borehole, which comprises:

a transmitter in proximity of said formation bed for transmitting a monopole acoustic waveform into said formation bed;

a monopole receiver in a logging tool for receiving a reflection of said monopole acoustic waveform and providing a first response signal;

a dipole receiver in said logging tool for receiving said reflection and providing a second response signal;

a first amplifier in electrical communication with said monopole receiver and receiving said first response signal for providing a first amplified signal;

a second amplifier in electrical communication with said dipole receiver and receiving said second response signal for providing a second amplified signal;

a first summer in electrical communication with said first amplifier and said second amplifier for adding said first amplified signal and said second amplified signal to provide a monopole beam pattern signal;

a differential amplifier in electrical communication with said first amplifier and said second amplifier for subtracting said second amplified signal from said first amplified signal to produce a dipole beam pattern signal;

a second summer in electrical communication with said first summer and said differential amplifier and receiving said monopole beam pattern signal and said dipole beam pattern signal for producing a cardioid pattern signal to provide a first indication of said azimuth position of said reflector when said monopole beam pattern signal and said dipole beam pattern signal have equal amplitudes; and a phase detector in electrical communication with said first summer and said differential amplifier, and receiving said monopole beam pattern signal and said dipole beam pattern signal for providing a second indication of said azimuth position of said reflector.

7. The system of claim 6 wherein a dipole acoustic waveform is generated by said transmitter, and said reflection is of said dipole acoustic waveform.

8. The system of claim 6 further comprising:

an orientation signal generator in said logging tool;

a first A/D converter in electrical communication with said second summer and receiving said cardioid signal pattern signal to provide a first digitized signal;

a second A/D converter in electrical communication with said phase detector and receiving said second indication of said azimuth position to provide a second digitized signal; and a digital processor in electrical communication with and receiving a time of transmission synchronization signal from said transmitter, and in electrical communication with and receiving an azimuth reference signal from said orientation generator; and in electrical communication with said first A/D converter and said second A/D converter and receiving said first digitized signal and said second digitized signal for providing said azimuth direction and a distance of said reflector outside said borehole.

9. The system of claim 6, wherein said monopole receiver means and said dipole receiver means are mathematically rotated by said digital processor means for improved resolution of said azimuth position.

* * * * *